United States Patent Office 3,621,499
Patented Nov. 23, 1971

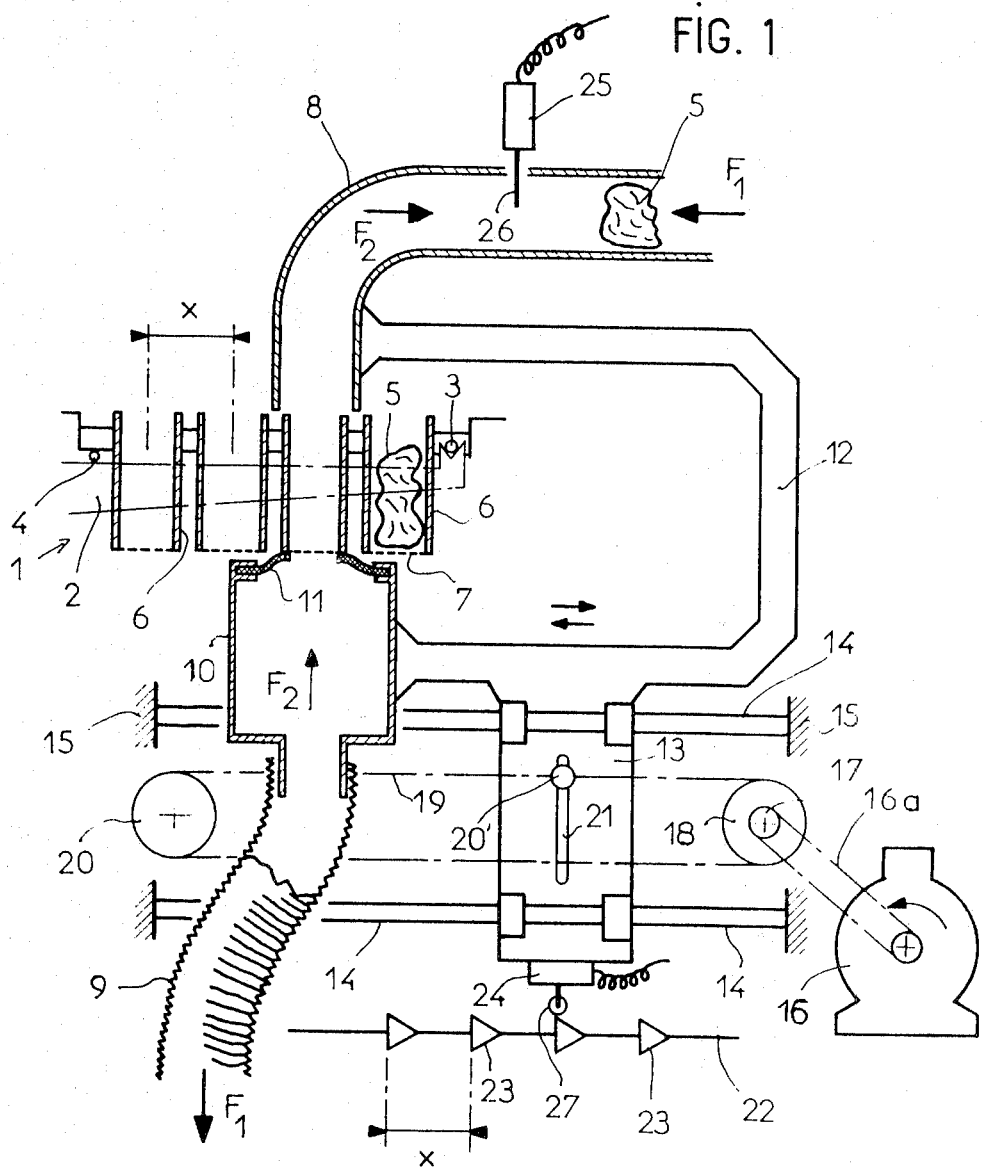

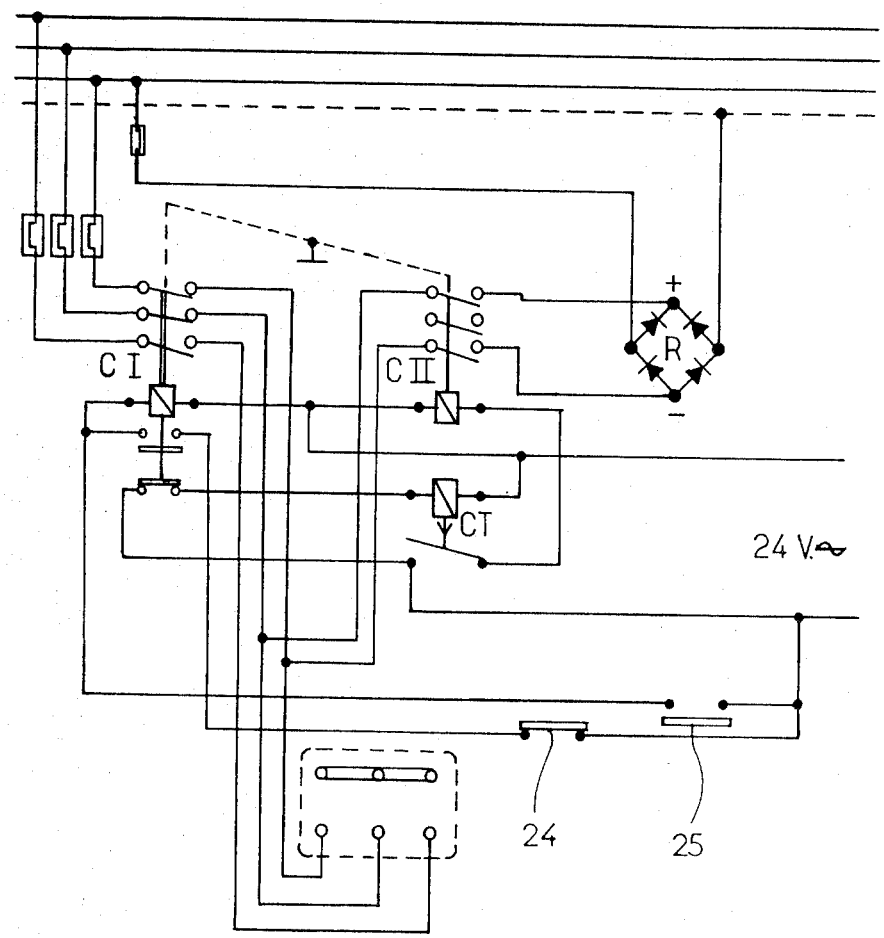

3,621,499
APPARATUS AND METHOD FOR LOADING AND UNLOADING A MULTIPLE CELL MODULE FOR PROCESSING TEXTILE ARTICLES
Maurice Joseph Heliot, 2 bis Rue Passerat, Troyes 10, France
Filed July 8, 1970, Ser. No. 53,258
Claims priority, application France, Feb. 3, 1970, 7003648
Int. Cl. D06f 35/00
U.S. Cl. 8—150                    12 Claims

ABSTRACT OF THE DISCLOSURE

An apparatus for loading or unloading textile articles from the individual cells of a multiple-cell module in which the goods are subjected to a processing under forced fluid flow, said cells having retaining means thereacross to retain an article while permitting fluid flow through the cell, which apparatus include pneumatic means for positioning an article in each cell at a loading station and withdrawing the article from each cell at a unloading station.

BACKGROUND OF THE DISCLOSURE

The present invention relates to an apparatus and method for loading textile articles into and unloading them from a so-called "module" comprising a plurality of cells in which the articles are dyed or otherwise processed under forced fluid flow, said module which is intended to retain textile articles such as stockings, tights and underclothes, while they are subject to a textile processing operation, being described and claimed in my co-pending application Ser. No. 53,255, entitled "Method and Device for the Processing of Textile Goods."

The described module for retaining textile articles comprises a plurality of cells, preferably cylindrical, which are carried in a supporting plate arranged to be conveyed to and held at the different stations of a processing plant, each cylindrical cell of the module being open at its upper extremity and having at its lower extremity a grid which simultaneously serves to retain the articles therein and to provide a passage for processing fluid traversing the cell. To increase the output of a plant employing such processing modules, it was necessary to find means for the loading and unloading the modules.

The present invention provides a solution to this problem in the form of an apparatus which renders it possible by simple means which do not damage the textile articles, automatically to ensure their successive positioning in the different cells of the module and, conversely, their withdrawal from the cells.

SUMMARY OF THE INVENTION

According to the invention there is provided an apparatus for loading or unloading textile articles from the individual cells of a multiple-cell module in which the goods are subjected to dyeing or other processing under forced fluid flow, the cells having retaining means thereacross to retain an article therein while permitting fluid flow through the cell, which apparatus includes pneumatic means for positioning an article in each cell at a loading station and withdrawing the article from each cell at an unloading station.

The apparatus also includes a blower operable either in suction or in delivery, to establish a current of air in a duct which is interrupted over a length corresponding to the length of a cell, for the purpose of allowing a cell of the module to be interposed at this point.

Further, to ensure the consecutive loading or unloading of the different cells of the module, the air duct into which each module is interposed is advanced automatically from one cell to another by means of an element which is advanced step-wise by means of a brake-motor, each operation of which is controlled by means of a contact actuated directly by the item or items allotted to a cell and being conveyed in the air duct.

An embodiment of the invention will now be described by way of example, with reference to the accompanying drawings.

BRIEF DESCRIPTION OF THE DRAWINGS

FIG. 1 is a diagrammatic elevation, partially in section, of a loading and unloading device; and, FIG. 2 is a circuit diagram for control of the device illustrated in FIG. 1.

DESCRIPTION OF THE PREFERRED EMBODIMENT

As shown in FIG. 1, a processing module, indicated generally by the reference 1 and comprising a series of cells 6, rests on arms 2 of a yoke carried, for example, by a turret conveying the module 1 to different stations of a plant for processing textile articles. The module 1 is borne at one end on the extremity of the arms 2 of the yoke by means of bearings or journals 3 and at its other end by an abutment 4.

In FIG. 1 the device is illustrated in a condition for the loading of a module. In this case, a blower (not illustrated) operates to draw the ambient air through each cell 6 in turn, that is to say along the direction of the arrows $F_1$. The air is drawn in along the direction of the arrow $F_1$ by the blower, to cause one or more items 5 of textile goods to be positioned within a cell 6 equipped with a retaining grid 7. The direction of circulation of the air is reversed so that it then circulates in the direction of the arrow $F_2$, to cause the unloading of the items 5.

The ducting through which the air is impelled comprises an upper duct 8 for conveyance of the items 5 which connects the upper part of a cell 6 either to a loading hopper or to a discharge bin (not shown); and a lower flexible duct 9 which is connected at one extremity to the intake or delivery side of the blower and at the other extremity to a blast box 10 equipped with sealing "lips" 11 intended to be engaged with the lower extremity of the cell 6 that is connected to the upper duct 8.

The upper duct 8 and the blast box 10 are mounted in fixed relation on a yoke 12 which is itself rigidly mounted on a carriage 13 arranged to advance step-by-step on slideways 14 carried on a frame 15, in order to carry the blast box 10 and the duct 8 simultaneously to the different cells 6 of the module.

The advance of the carriage 13 on the slideways 14 is effected by means of a brake-motor 16 which transmits drive through a chain 16a to a chain sprocket 17 solid with another chain sprocket 18 over which runs an endless chain 19 which lies in a vertical plane and which returns over a chain sprocket 20. On the chain 19 is fastened a peg 20' penetrating into a vertical opening 21 in the carriage 13.

The step-by-step advance of the carriage 13 required for the successive positioning of the blast box 10 and of the duct 8 at the extremities of the consecutive cells 6 of the module 1 is assured by means of a control bar 22 equipped with conical pegs 23 cooperating successively with a withdrawable contact 24 which operates in one direction of displacement only to stop the motor 16. The motor 16 is started by a contact 25 comprising a blade 26 projecting into the duct 8 for conveyance of the items 5 and arranged for direct actuation by these latter in both loading and unloading directions.

The gap $x$ between the conical pegs 23 corresponds to the gap $x$ separating the axes of two consecutive cells 6 of the module.

The contact 25 for starting the motor 16 which effects the step-by-step advance of the carriage 13, as well as the withdrawable contact 24 cooperating with the conical pegs 23, are connected into a control circuit which is driven from a three phase AC supply and comprises a bridge rectifier R feeding a low voltage DC current to a DC contact $C_{II}$ and a time-delay relay $C_T$ prohibiting actuation of an AC contact $C_I$ to start the motor 16 except when an item 5 has been positioned in a cell 6.

The operation of the device will now be described:

When an item 5 is to be inserted into a cell 6 of the module 1, the blower is connected so that the air circulates in the ducts 8 and 9 in the direction of the arrow $F_1$, that is to say the flexible duct 9 is connected to the "suction" side of the blower. The blast box 10 being sealed by means of its lips 11 to the first cell 6 of the module, an item 5 is offered up to the open extremity of the duct 8, which item is drawn in and positioned in the cell 6.

During its displacement by suction through the duct 8, the item 5 actuates the blade 26 of the contact 25 through the time-delay relay $C_T$, causing the motor 16 to start once the item 5 is positioned in the cell 6.

Driven by the motor 16 through the chain 16a and the sprockets 17 and 18, the chain 19 entrains the peg 20' engaged in the vertical opening 21 of the carriage 13 to the left. This latter, which carries the withdrawable contact 24, is then displaced towards the left in FIG. 2 until the roller 27 of the withdrawable contact 24 rolling over the crest of the next conical peg 23 stops the motor 16. The blast box 10 is thus positioned precisely beneath the next cell 6 of the module, since the distance separating the two consecutive pegs 23 corresponds to the gap present between the axes of two consecutive cells 6.

On the subsequent insertion of an item 5 into the duct 8, this item strikes the blade 26 of the contact 25 and the previously described cycle is repeated. This operation is repeated in respect of all the cells 6 of the module.

The insertion of an item 5 into the last cell 6 causes the return of the carriage 13 to its initial position: the peg 20' on the chain 19 is displaced towards the right, but the withdrawable contact 24 is not operated, with the result that the motor 16 is not stopped again until the moment when the roller 27 rises on the first right-hand peg after the peg 20' has revolved around the chain sprocket 18 and is again positioned in the upper part of the opening 21 in the carriage 13.

The operation of the device for the unloading of items 5 contained in the different cells 6 of the module is identical to that which has been described, except that the flexible duct 9 is then connected to the delivery side of the blower and that the switch 25 is actuated by the items 5 ejected through the duct 8 in the direction of the arrow $F_2$.

When a loading station and an unloading station are situated close to each other, it is obviously possible to employ one blower only for their operation, whereof the "suction" side is connected to the blast box 10 of the loading device and the "delivery" side is connected to the blast box 10 of the unloading device, each having the same structure as that illustrated in FIG. 1. By incorporating a blast box having several orifices, and several ducts 8 equipped with contacts connected in series, it is possible to perform the loading or unloading of modules comprising several parallel rows of cells.

I claim:

1. An apparatus for loading or unloading textile articles from the individual cells of a multiple-cell module in which the goods are subjected to dyeing or other processing under forced fluid flow, the cells having retaining means thereacross to retain an article therein while permitting fluid flow through the cell, which apparatus includes pneumatic means for positioning an article in each cell at a loading station and withdrawing the article from each cell at an unloading station.

2. An apparatus as claimed in claim 1, wherein the loading station and unloading station are combined into a single station.

3. An apparatus as claimed in claim 2, which also includes a duct interrupted to allow interposition of a cell and blower means operable to establish a reversible flow of air through the duct and interposed cell to carry the article to or from the cell.

4. An apparatus as claimed in claim 3, additionally including an element on which the duct is mounted and which is advanceable from cell to cell, a brake-motor for driving the element, a contact actuated by the passage in either direction of one or more articles allocated to the cell interposed in the duct and completing a circuit to operate the motor for each advance.

5. An apparatus as claimed in claim 4, wherein the air duct comprises a conveyor portion for conveyance of the articles to and from the cells which is connectable to one extremity of each cell in the module, and a flexible duct portion which is connected at one end to the suction or delivery side of the blower and at the other end to a blast box having sealing means for engagement with the other extremity of said cell.

6. An apparatus as claimed in claim 5, wherein the element includes a carriage bearing a yoke on which said duct portions are mounted in fixed spaced relationship, the carriage being arranged for step-wise advance on a slideway for simultaneously bringing the blast-box and conveyor duct into register with the corresponding extremities of each cell.

7. An apparatus as claimed in claim 6, wherein the brake-motor causes reciprocating displacement of the carriage by means of a chain provided with a latent projection in engagement with an opening or slot in the carriage.

8. An apparatus as claimed in claim 7, additionally including a control bar having projections arranged for successive cooperation with a withdrawable contact, mounted on the carriage, operating only in one direction of displacement of the carriage for stopping the brake-motor during its step-wise displacement and its return to the initial position.

9. An apparatus as claimed in claim 8, wherein the gap between the projections on the control bar are spaced apart by an interval corresponding to that between the axes of two adjacent cells of the module.

10. An apparatus as claimed in claim 8, wherein the contact associated with the conveyor duct and the withdrawable contact on the carriage are connected into a control circuit receiving a three-phase AC supply and comprising a bridge rectifier feeding low-voltage DC current through a time-delay switch to a DC contact controlling an AC switch closing an AC supply circuit to the motor.

11. A method of loading textile articles into or unloading them from a multiple-cell module in which they are subjected to dyeing or other processing under forced fluid flow, the cells having retaining means thereacross for retaining the articles while permitting the passage of fluid through the cells, wherein the improvement comprises applying across each cell in turn a gas stream in which the article is carried to or from the cell.

12. A method as claimed in claim 11, wherein the gas stream is fed through a duct which is interrupted to receive a cell and the duct is moved from cell to cell.

References Cited

FOREIGN PATENTS 467,594    6/1937    Great Britain _____ 68—210

WILLIAM I. PRICE, Primary Examiner

U.S. Cl. X.R.

68—27, 210